(12) United States Patent
Unruh et al.

(10) Patent No.: US 7,623,952 B2
(45) Date of Patent: Nov. 24, 2009

(54) GPS CONTROLLED GUIDANCE SYSTEM FOR FARM TRACTOR/IMPLEMENT COMBINATION

(75) Inventors: Marlin W. Unruh, Madrid, NE (US); Eugene H. Schmidt, Madrid, NE (US)

(73) Assignee: A.I.L., Inc., North Platte, NE (US)

( * ) Notice: Subject to any disclaimer, the term of this patent is extended or adjusted under 35 U.S.C. 154(b) by 33 days.

(21) Appl. No.: 11/981,217

(22) Filed: Oct. 31, 2007

(65) Prior Publication Data

US 2008/0060825 A1 Mar. 13, 2008

Related U.S. Application Data

(63) Continuation-in-part of application No. 11/111,346, filed on Apr. 21, 2005.

(51) Int. Cl.
*G06F 19/00* (2006.01)
(52) U.S. Cl. ............. 701/50; 701/213; 342/357.02
(58) Field of Classification Search ............ 701/26, 701/50, 213, 210, 205, 207, 23; 342/357.01–357.08
See application file for complete search history.

(56) References Cited

U.S. PATENT DOCUMENTS

| | | | |
|---|---|---|---|
| 5,025,866 A | 6/1991 | Schmidt et al. | |
| RE34,080 E | 9/1992 | Schmidt | |
| 5,170,849 A | 12/1992 | Nikkel et al. | |
| 5,240,079 A | 8/1993 | Schmidt | |
| 5,515,928 A | 5/1996 | Niday | |
| 5,813,472 A | 9/1998 | Fixemer | |
| 6,070,673 A * | 6/2000 | Wendte | 172/2 |
| 6,198,992 B1 | 3/2001 | Winslow | |
| 6,336,066 B1 | 1/2002 | Pellenc et al. | |
| 6,434,462 B1 | 8/2002 | Bevly et al. | |

(Continued)

FOREIGN PATENT DOCUMENTS

WO WO02080652 * 10/2002

OTHER PUBLICATIONS

Trimble website. Dec. 2, 2004. http://www.trimble.com/ (http://web.archive.org/web/20041202144502/http://www.trimble.com/) www.trimble.com/AgGPS_ezsteer.html (http://web.archive.org/web/20041208022827/www.trimble.com/AgGPS_ezsteer.html).

*Primary Examiner*—Richard M. Camby
(74) *Attorney, Agent, or Firm*—Greer, Burns & Crain, Ltd.

(57) ABSTRACT

Embodiments of the present invention comprise a system for positioning a drawn implement having a transverse tool bar being pulled by a vehicle traveling generally along a desired path of movement, the vehicle having a mounting hitch on the rear end thereof where a system hitch is configured to adjust its angular orientation and that of the tool bar relative to the vehicle mounting hitch and a global positioning system having an antenna mounted on the system hitch operable to detect the position of the tool bar of the implement relative to the desired path as the vehicle moves generally along the desired path and generate a signal that is indicative of the lateral position of the implement relative to the desired path and means for controlling the hitch means to adjust the angular orientation of the hitch means and the tool bar so that the implement follows the desired path of movement in response to the global positioning system signals.

6 Claims, 5 Drawing Sheets

U.S. PATENT DOCUMENTS

| | | |
|---|---|---|
| 6,501,422 B1 | 12/2002 | Nichols |
| 6,581,695 B2 | 6/2003 | Bernhardt et al. |
| 6,711,501 B2 | 3/2004 | McClure et al. |
| 6,804,597 B1 | 10/2004 | Posselius et al. |
| 6,865,465 B2 | 3/2005 | McClure |
| 7,054,731 B1 | 5/2006 | Lange et al. |
| 7,460,942 B2 * | 12/2008 | Mailer .......................... 701/50 |

* cited by examiner

GPS CONTROLLED GUIDANCE SYSTEM FOR FARM TRACTOR/IMPLEMENT COMBINATION

This is a Continuation-in-part of application Ser. No. 11/111,346, filed Apr. 21, 2005.

The present invention generally relates to guidance control systems for implements that trail a vehicle and for the vehicle that pulls the implements.

In the farming industry, guidance systems for controlling the position of trailing implements have been developed and marketed for many years. The design of some of the types of systems has limited their effectiveness and accuracy with regard to positioning the implement. Guidance systems that have exhibited reliable and accurate operation are those manufactured and marketed by Sunco of North Platte and Madrid, Nebr.

The Sunco systems are marketed under the trademark AcuraTrak have exhibited superior operating characteristics for guiding many types of trailing implements that are pulled by farm tractors. While some guidance systems are designed to be more concerned with controlling the tractor itself, the AcuraTrak system is designed to control the lateral position of an implement relative to the tractor that is pulling it, with the focus being on proper positioning of the implement along a desired path as the implement is pulled through a field during operation. The currently marketed Acura Track guidance systems operate in a manner based on principles that are set forth in U.S. Pat. Nos. 5,240,079, 5,150,849 and Re. 34,080, and are generally applicable to certain aspects of the present invention. All of these patents are specifically incorporated by reference herein.

The guidance systems disclosed in those patents utilize a wand mechanism associated with the implement which is dragged along the ground and is a common means for sensing the relative position of the implement relative to the rows. The wand is mounted on the implement in a manner that it is positioned in the middle of the distance between two adjacent rows. The midpoint between two rows is usually the lowest point between the rows, since a cultivating operation tends to move dirt from the middle toward the plants, for example. The wand is angularly moveable so that its angular position can change depending upon whether the implement is oriented in the center between adjacent rows or is offset from the center. Thus, if the implement is moving to one side of center to the other, the angular position of the wand will change and provide corrective signals for controlling the guidance system to alter the lateral position of the implement relative to the rows.

It should be easily understood that if an operator is cultivating a crop that has already reached a stand, or is planting or marking out rows, or the like, the difficulty does not reside in the operator being able to keep the tractor between the rows without the tractor wheels crushing the crop, but rather keeping the implement from getting too close to the crop which could, in the case of cultivation, result in damage to the roots of the crop by the cultivator blades. In the case of marking out rows, it is obviously desirable to have uniform rows.

The AcuraTrak System has a mechanism that attaches to the three point hitch of the tractor and effectively lengthens one side and correspondingly shortens the other side to correct for lateral movement of the implement from the center of the rows. The mechanism operates in combination with a stabilizing or Coulter wheel, which is a disc-like wheel attached to the rear of the implement that engages the ground. The stabilizing wheel provides a fulcrum about which adjustment of the mechanism makes the necessary corrections to keep the implement centered between the rows.

With the advent of global positioning systems (GPS), it has been the desire, if not the goal of many in the agricultural industry to use GPS systems as the navigation tool to control tractors during a planting or other farming operation to make and/or follow rows that are properly aligned in a field and relative to other rows. Improvements in the GPS signals now enables positioning within a tolerance of an inch or less during a farming operation, also enables accurate mapping of paths that a vehicle should travel. The combination of these capabilities has resulted in increased success in integrating automated guidance controls for tractors. However, controlling the path of a tractor does not necessarily result in the implement following the desired path.

SUMMARY OF THE INVENTION

Embodiments of the present invention comprise a system for positioning a drawn implement having a transverse tool bar being pulled by a vehicle traveling generally along a desired path of movement, the vehicle having a mounting hitch on the rear end thereof where a system hitch is configured to adjust its angular orientation and that of the tool bar relative to the vehicle mounting hitch and a global positioning system having an antenna mounted preferably near or forwardly of the implement tool bar including being on the system hitch operable to effectively detect the position of the tool bar of the implement relative to the desired path as the vehicle moves generally along the desired path so that the implement follows the desired path of movement in response to the global positioning system signals.

DETAILED DESCRIPTION

Broadly stated, a guidance control system for farm tractors in combination with a trailing implement is shown and described herein, although the guidance system is not limited to such a particular application. It is contemplated that the guidance control system could be used with vehicles other than farm tractors and could have general applicability to any such vehicle that would utilize a mounting hitch to which some type of implement could be attached where side to side adjustability for controlling the path of movement of the implement is desired.

However, the system is particularly useful in guiding implements that trail a tractor including but not limited to those used in row crop farming. The preferred embodiment of the system disclosed herein is particularly configured for use with a 3-point mounting hitch (also known as a quick hitch) in conjunction with a coulter disc, but other embodiments can be used with a sliding side-to-side type of adjustment, and even a a draw-type hitch. The preferred embodiment of the guidance system includes a system hitch that is connected to the 3-point mounting hitch and is configured to effectively extend and retract the two lower connections between the implement and the tractor, with the extension of one side resulting in retraction of the other, thereby changing the angle of the guidance system hitch relative to the angle of the mounting hitch.

The preferred embodiment of the present invention is directed to a system which is configured to operate to have an implement being pulled by a vehicle accurately follow a desired path that is defined in some manner and stored in a memory of a GPS system. The preferred embodiment has a GPS antenna that is mounted either to the forward end of the implement being drawn or to a portion of the tractor hitch that moves laterally relative to the tractor itself and it is the operation of the GPS system to generate correction signals when the implement veers off of the desired path.

Some embodiments of the guidance system do not use the GPS system to steer the tractor nor are the correction signals determined in a manner which causes the tractor to change course, but the correction signals cause the guidance system to adjust the angular orientation of the implement to change and thereby correct the path of movement of the implement. Most known guidance systems merely track the course of the tractor along the desired path of movement or detect both the tractor and the implement by means of GPS antennas being located on both of them. In these known systems, any correction of the desired path is achieved by controlling the steering of the tractor in a manner which will reduce the error in the path of the implement. That manner of guidance is not the manner of operation of the preferred embodiment of the present invention. The preferred embodiment of the present invention effectively tracks the position of the implement along the desired path and makes corrections to the orientation of the implement relative to the tractor. Significantly, if the tractor is traveling along a path that is generally within the bounds of correction by the implement, the implement will keep moving along the desired path. As a consequence of keeping the implement on its desired path, any deviation of the tractor from the desired path can be determined from those embodiments of the implement guidance system which include the capability of sensing the position of the hitch relative to the tractor and such determination is in the form of an electrical signal that can be used to automate the steering of the tractor.

Figure 1A:
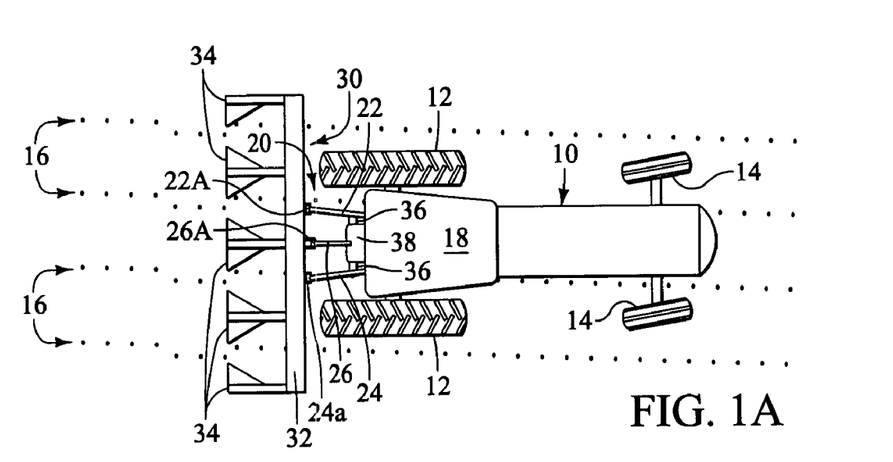
FIGS. 1A, 1B, 1C, 1D and 1E are greatly simplified top views of a tractor traveling down a row and illustrating the operation of the hitch mechanism that is associated with the guidance system disclosed herein and also showing a trailing implement that is equipped with a stabilizing disc when the tractor is traveling at various angular orientations relative to the rows.
Figure 3:
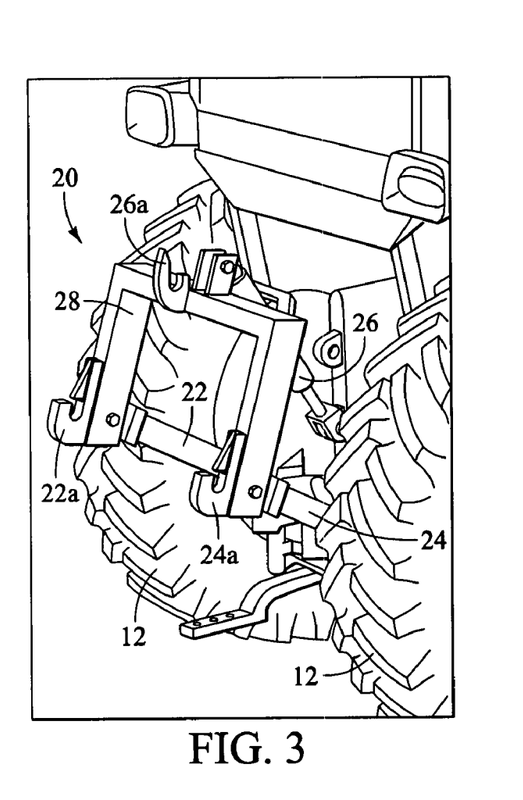
FIG. 3 is a perspective of the back of a tractor having a 3 point hitch.

Referring to the drawings, and particularly FIG. 1A, a tractor, indicated generally at 10, has rear drive wheels 12 and front wheels 14 for steering the same through a field having rows 16 of crop plants. The tractor 10 has a cab 18 and a 3-point mounting hitch, indicated generally at 20, comprised of left and right outer draft links 22, 24 and a center link 26 for mounting implements. As shown in FIG. 3, which illustrates an actual 3-point hitch mounted on a tractor, the left and right draft links 22, 24 are lower than the center link 26 and all of these links are shown to be connected to a generally upside down U-shaped frame 28, with the frame having upwardly oriented hooks 22A, 24A and 28A which are configured to hook onto an implement, indicated generally at 30 in FIG. 1A, which has a transverse toolbar 32 and a number of cultivating tools 34 mounted to the toolbar 32. It should also be understood that many implements have a toolbar to which other tools are mounted, such as bedders, strip till machines, planters, debris clearing tools and the like. Also, the representation of FIG. 1A does not illustrate the frame 28 for the sake of simplicity. However, the current 3-point mounting hitches being marketed do have such a frame 28.

As is also illustrated in FIG. 1A, the lower outer 3-point links 22 and 24 that are attached to the implement toolbar 32 form a generally V-shape in that the links 22 and 24 are narrower in the front where they attach to the tractor than the opposite end where they attach to the implement toolbar 32. The tractor 10 also has sway blocks 36 attached along the length of the 3-point links 22, 24 on both sides generally at the rear of its transmission housing 38. The sway blocks 36 can be positioned to prevent lateral movement of the lower 3-point links 22, 24 as they are lifted and lowered or can be adjusted so that the links are at least partially free to move in the lowered working position, but permit no lateral motion in the raised or transport position.

Because of the V-shape of the links 22, 24 when they are lowered into the working position, the 3-point links 22, 24, 26 are free to move back and forth or transversely relative to the path of movement of the tractor 10, the implement 30 tends to move on its own in a side to side arc. If the links are not free to move, the implement 30 is held rigid to the tractor 10, the condition commonly known as "tail out" occurs. As is particularly illustrated in FIG. 1A, if the tractor 10 is steered left for whatever reason, the implement 30 will move in the opposite rightward direction, and can cause damage to plants in the row by the cultivating tools 34 as shown at 40. A "Tail out" condition is also undesirable for the reasons that it drains horsepower and creates operator fatigue.

While the illustration of FIG. 1A is intended to illustrate the environment of a tractor/implement combination in a field and particularly to describe a tail-out condition, it does not illustrate a guidance system.

Figure 2A:
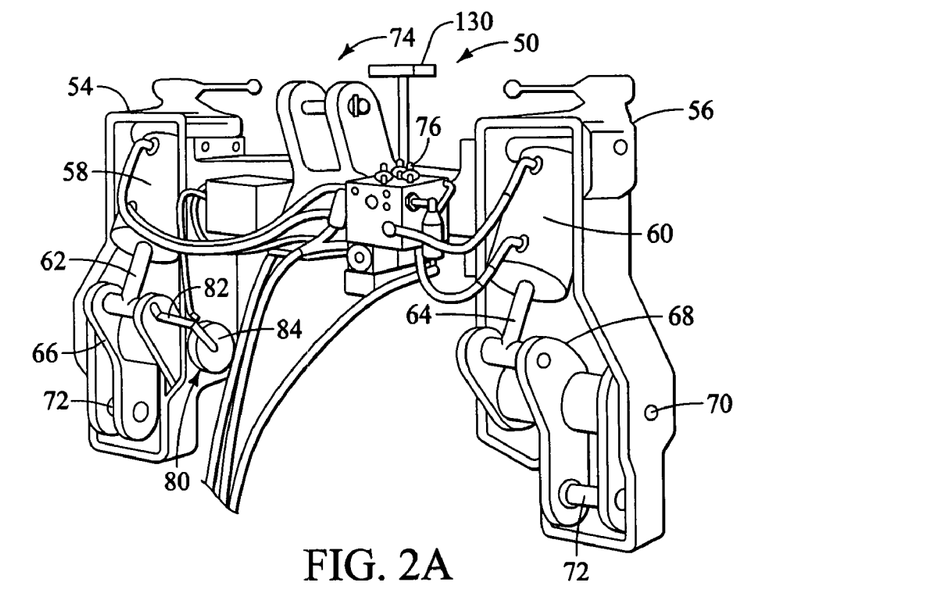
FIG. 2A is a perspective view of the rear of the system hitch that is attached to the three point hitch of a tractor and to which the implement is to be attached.
Figure 2B:
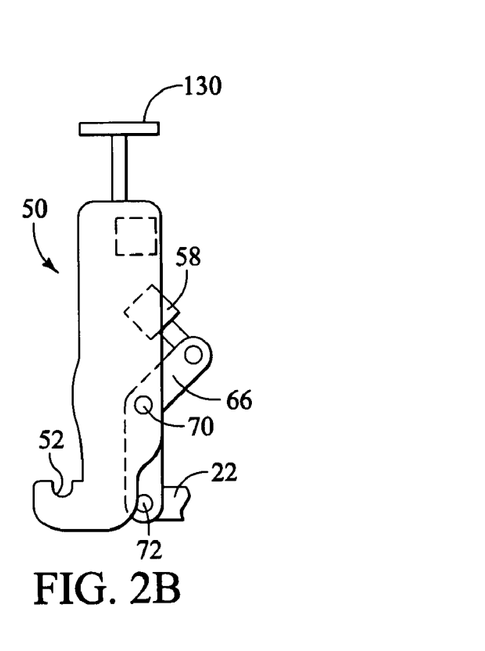
FIG. 2B is a side view of the system hitch.

The preferred embodiment of the guidance system is partially illustrated in FIGS. 2A and 2B which illustrates the hitch, indicated generally at 50, of the guidance system. The hitch 50 is connected to the mounting hitch hooks 22A, 24A and 26A and the implement is then attached to three points of the guidance system hitch 50, such as left guidance hitch hook 52 that is shown in the side view of FIG. 2B.

Referring to FIG. 2A, which shows the guidance system hitch 50 from the front end, i.e., the end which attaches to the tractor 10, the hitch 50 has a left side casting 54, a right side casting 56, which respectively contain left and right hydraulic cylinders 58 and 60. The cylinder 58 has an extendable piston 62 whereas the cylinder 60 has a similar piston 64, with each of the pistons being connected to crank arms 66 and 68, respectively, each of which pivots around a shaft such as the right shaft 70, the left not being shown. The crank arms 68 have a mounting pin 72 for attachment to the mounting hitch 20. A center clevis, indicated generally at 74, also mounts to the middle hook 26A of the 3-point mounting hitch 20. The cylinders 58 and 60 are connected to a hydraulic system, generally contained within the box 76, which is preferably connected to the hydraulic system of the tractor. The box also contains a hydraulic valve that controls the position of the cylinders as a function of the control signals that are generated by the GPS control module. The hydraulic lines are preferably connected so that extension of one cylinder 58 will result in displacement of fluid from one end of the cylinder and will cause a similar displacement in the opposite cylinder 60 to result in comparable retraction of its piston 64. Movement of the pistons 62 or 64 will rotate the crank arms 66 or 68 around their shafts and by virtue of the connection with clevis pins 72, result in movement of one side or the other toward and away from the tractor to thereby change the angular orientation of the guidance system hitch 50 relative to the tractor 10.

To measure the position of the crank arms 66 and 68 and thereby the angular orientation of the guidance system hitch 50, a hitch angle sensor mechanism, indicated generally at 80, is provided and it comprises a rotatable arm 82 that is connected to the crank arm 66 and pivots around a potentiometer 84 which generates an electrical signal that is indicative of the angular position of the arm 82. Since the arm 82 is connected to the crank arm 66, the sensor mechanism 84 provides a signal that is indicative of the position of the crank arm 66, which in turn is indicative of the angular orientation of the hitch 50 relative to the mounting hitch 20.

It should be understood that if the hitch 50 is centered, the crank arms 66 and 68 will be in the same longitudinal position, i.e., the distance from the left and right clevis pins 72 to the respective left and right hooks 52 will be the same. This means that the implement 30 is necessarily straight behind the tractor 10. If the implement 30 is centered between the rows 16, it also means the tractor 10 is traveling down a path so that the wheels are centered between adjacent rows 16 as is desired. Importantly therefore, when the guidance system is operating to maintain the implement traveling along the desired path "centered" between the rows, the potentiometer 84 signal is proportional to the path of the tractor 10. If the guidance system requires a correction to keep the implement on a desired path, it will cause the crank arms 66 and 68 to adjust and such an adjustment will cause the potentiometer 84 to generate a signal that can be used to steer the tractor 10 itself.

Returning to FIGS. 1A through 1E, these diagrammatic representations show the guidance system hitch 50 mounted on the tractor 10 and also show a stabilizing or coulter disc 88 that is attached to and carried by a frame structure 90 that is preferably mounted to the implement toolbar 32 and located some distance behind the toolbar 32. This stabilizing disc 88 penetrates into the soil and acts as a fulcrum about which the implement 30 can be angled. Stated in other words, when the angle of the hitch 50 is changed, it slightly changes the angular orientation of the stabilizing disc 88 and causes the implement 30 to be transversely moved during forward movement to bring the implement 30 back to center along the desired path of movement. It should be understood that while it is preferred that a stabilizing disc 88 be used, a stabilizing wheel may used in some applications. It may be possible that some implements may not require a stabilizing disc at all, provided that the natural operational characteristics of the implement be such that the implement would tend to rotate in the same way as if a stabilizing disc 88 were present. Establishing a stable fulcrum is very important with the preferred embodiment of the present invention.

Figure 1B:
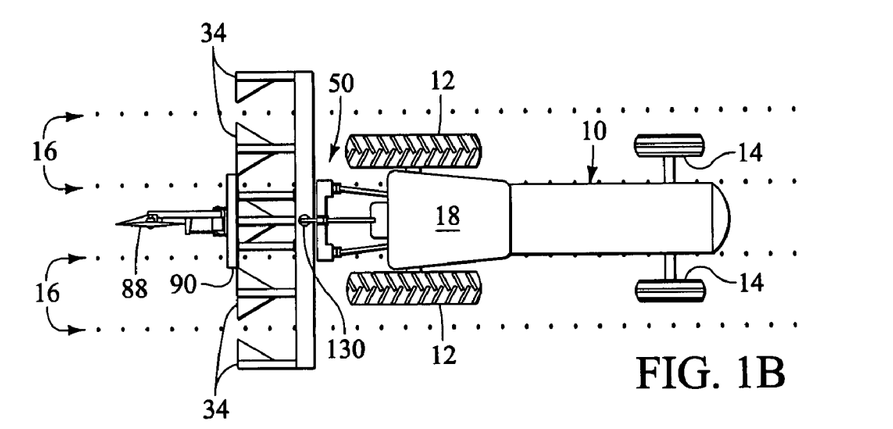

The illustration of FIG. 1B shows the tractor 10 moving down the rows in a centered position wherein the rear and front wheels 12, 14 are traveling midway between adjacent rows 16 and the implement 30 is similarly centered relative to the tractor. In this circumstance, the effective length of the left and right linkages are equal, and the toolbar 32 is perpendicular to the direction of the rows. The desired path of the implement 30 is being followed. It should be understood that the term "effective length" of one of the linkages means (for the left linkage, for example) the length of the link 22 plus the distance between the clevis pin 72 and the hook 52. The latter distance varies as the clevis arm 66 is rotated by operation of the cylinder 58.

Figure 1C:
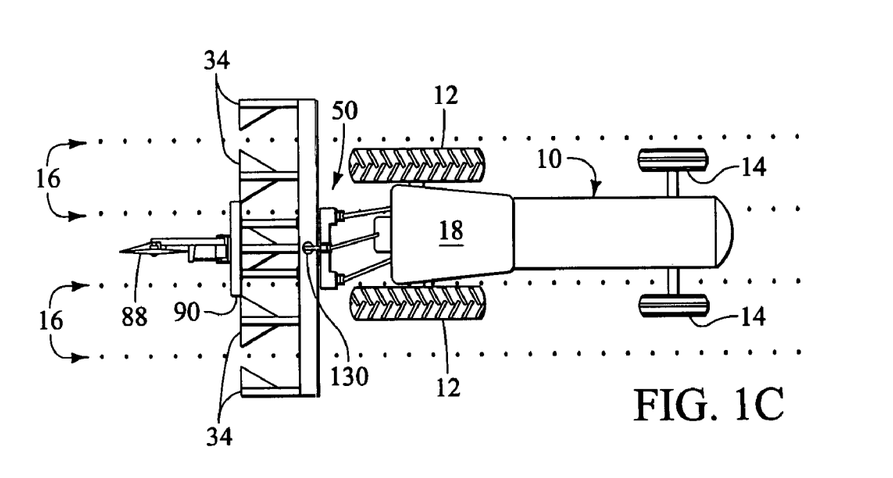
Figure 1D:
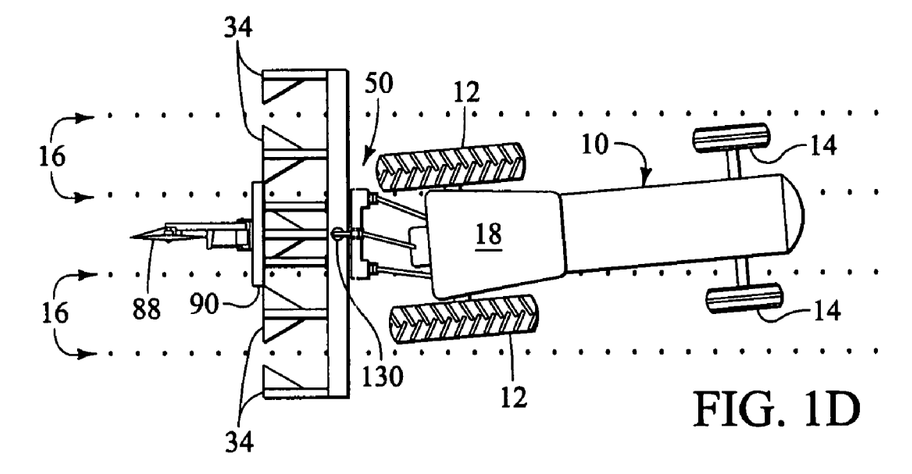

In FIG. 1D, the tractor is shown beginning to move left of the desired path. As this occurs, the links 22, 24, 26 swing left, the cylinders move to increase the effective length of the right linkage 24 and decrease effective length of the left linkage 22. If the operator steers the tractor so that the tractor stays left of the desired path as shown in FIG. 1C, the cylinders generally maintain the effective lengths of the linkages so that the implement maintains its centered position even though the tractor is not centered.

Figure 1E:
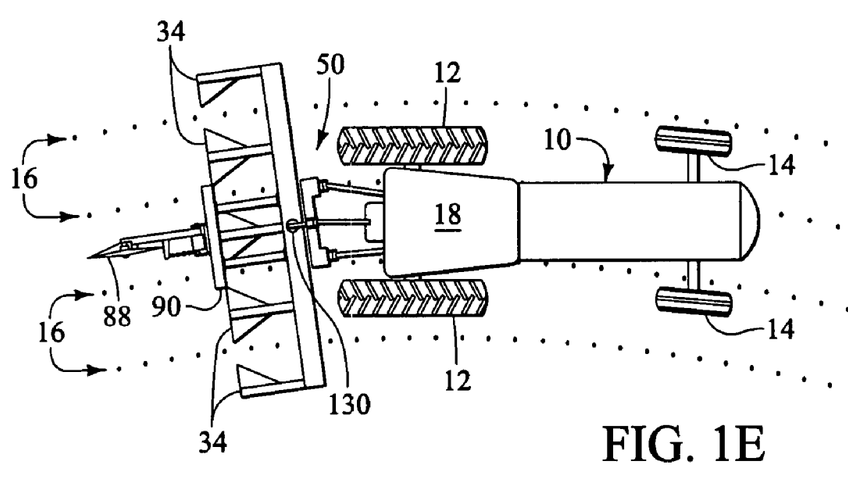

If the desired path is curved as often occurs when operating in land contours, FIG. 1E illustrates that as the tractor moves on a contour to the right, the cylinders increase the effective length of the left linkage 22 and shorten the effective length of the right linkage 24. Depending on the severity of the curve of the contour, the action of the cylinders and linkages will continue at varying degrees around the contour always keeping the implement toolbar 32 perpendicular to the desired path and pointed toward the center of the contour. The opposite action takes place on a left contour. As the contour straightens, the cylinders will equalize the effective lengths of the linkages as the tractor moves to the correct position in relation to the desired path.

Thus, with the corrections that are made by the guidance system, the tractor 10 does not have to be precisely maintained along the desired path and the system will maintain the implement 30 centered relative to the rows 16. When the angle of the guidance system hitch 50 is changed relative to the mounting hitch 20, it is also important that the links 22, 24, 26 of the mounting hitch 20 be free to move from side to side by a predetermined amount, preferably about 10 inches. This permits angulation of the system hitch 50 to result in the centering movement of the system hitch 50 as well as the rear portion of the mounting hitch 20 relative to the lateral position of the tractor 10 itself.

Figure 4:
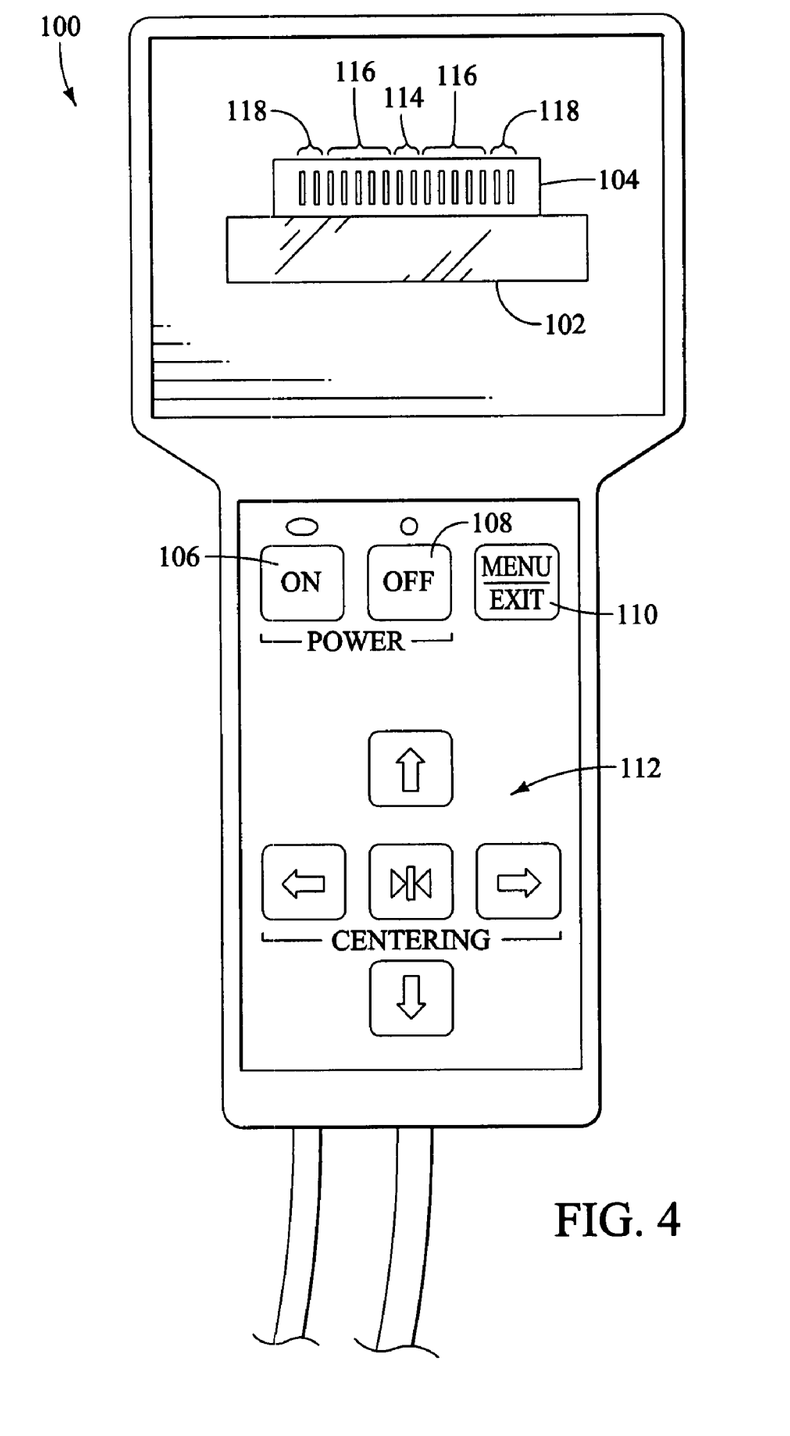
FIG. 4 is a plan view of the control module of the present invention.

The system includes a control console 100 that is preferably installed inside the cab 18 of the tractor 10. This console 100 has a digital display 102 that can provide important information relating to the status and operation of the system. More particularly, it can describe necessary steps in the operation of the system as well as diagnostic checks of the system. It can provide a scrolling functionality as well as static messages. The console 100 also has a illuminated bar chart 104, an on button 106, an off button 108 and a menu/exit button 110. In addition, a cluster of five buttons 112 are provided which perform different functions depending upon menu selections.

With regard to the bar graph 104, it includes a pair of green bars 114, a set of five yellow bars 116 located on opposite sides of the green bars 114 and a pair of red bars 118 located on each end. These bars effectively provide an indication of the position of the tractor 10 relative to the implement 30 during operation, with the green bars 114 being illuminated if the tractor is centered, the yellow bars being illuminated if the tractor is deviating from center, with the number of bars being proportional to the amount of deviation. The red bars 118 indicate that the tractor has deviated from center by an amount that is beyond effective control or reliable operation.

The signals that control the bars that are illuminated originate from the sensor 80 that monitors the angular position of the crank arm 66. With regard to the cluster of keys 112, these keys allow the center position of the system to be manually offset to the left or right. This is done by pressing either one of the left or right arrow keys. By pressing the left arrow key, it will offset the center to the left whereas the right arrow will offset the center to the right. The system will then operate from the offset center position until it is changed or restored to the true center. Pressing the centering key i.e. the key between the left and right arrows, will immediately bring the hitch 50 back to the true center.

The menu key 110 allows adjustment of operating parameters, diagnosis and calibration of the system, among other actions. By pressing the menu key, the menu is opened and the up and down arrow keys of the cluster 112 can be used to scroll through the menu items. In this mode of operation, the right arrow and left arrow keys can be used to change individual settings of parameter and the center key can then be used to lock-in the settings. To exit the menu, the menu key is again pressed. While this matter of operation is preferred, it should be understood that other functionality and operating procedures can be implemented.

The signal that is used to control the bar chart 104 originates from the sensing hitch angle sensor mechanism 80, and as previously described, this hitch angle sensor mechanism effectively determines the center position of the tractor 10, assuming that the guiding system has the implement 30 in its centered position. The signals can be used by a tractor steering mechanism to keep the tractor in a centered position, provided the implement is being controlled to maintain its movement along the desired path during operation. It should be understood that although the GPS system is used to guide the implement along the desired path in the preferred embodiment, and that the hitch angle sensor mechanism 80 effectively determines the center position of the tractor 10, and therefore can be used to steer the tractor, the hitch angle sensor mechanism 80 can also be used to steer the tractor even if the implement guidance is carried out using the traditional wand mechanisms rather than a GPS system.

Figure 5:
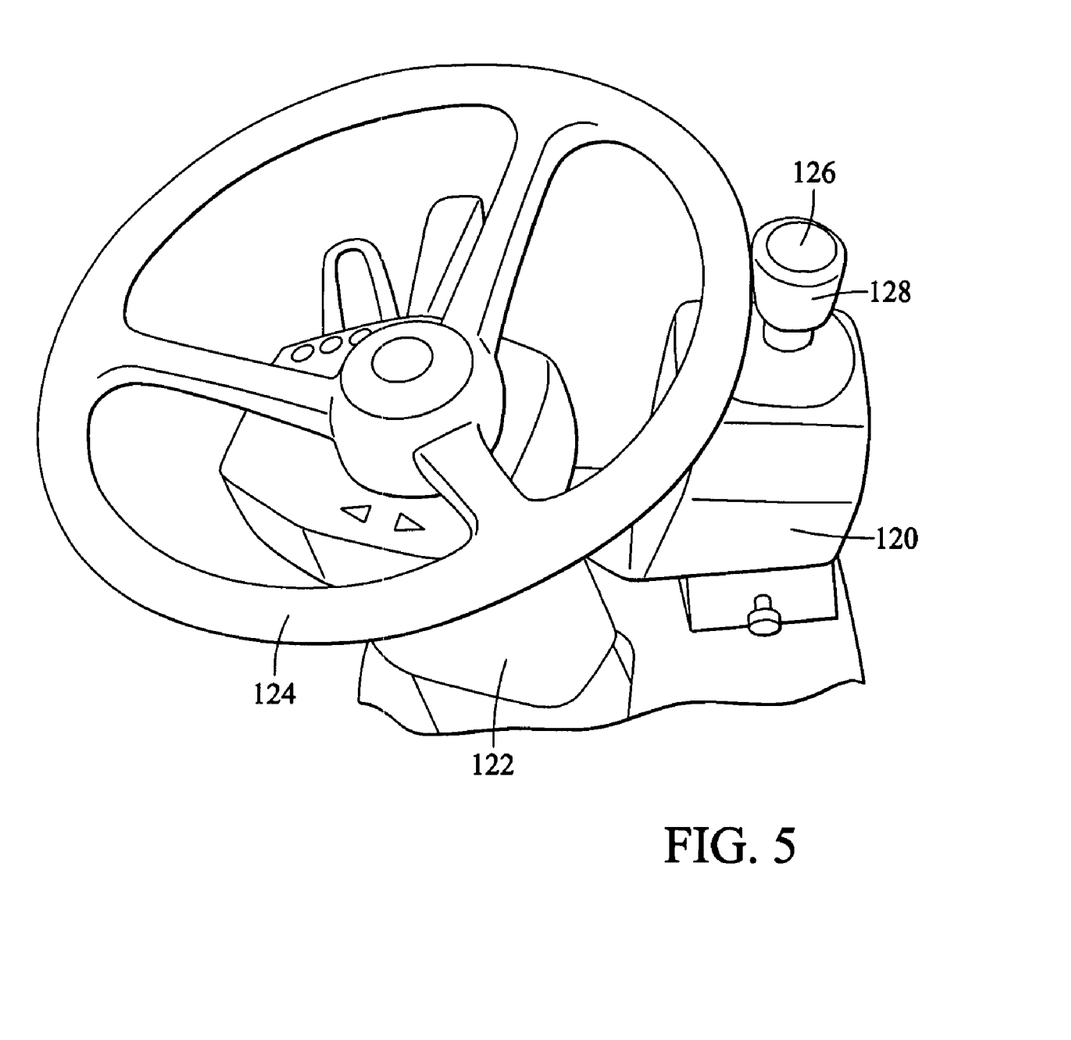
FIG. 5 is a perspective view of a representative steering wheel of a tractor shown with a steering module for steering the tractor.

Referring to FIG. 5, the sensor mechanism signals can be used in connection with a commercially available product that is marketed under the trademark EZ-STEER that is manufactured and marketed by the Trimble Company of Sunnyvale, Calif. This mechanism has a steering module 120 that is mounted to a steering column 122 of a steering wheel 124. The module 120 has a rotatable output shaft 126 with a soft rubber outer covering 128 that engages the steering wheel of a tractor. It also has a retractable mechanism that enables the module to be moved into and out of engagement with the steering wheel. Using the sensor mechanism signals to rotate the output shaft 126 in the clockwise or counterclockwise direction will rotate the steering wheel 124 accordingly for steering the tractor. While the illustration of FIG. 5 is intended to be representative of a tractor, it is apparent that only a steering wheel and associated components is actually shown together with the steering module 120. It should also be understood that hydraulic steering mechanisms are also commercially available that tie into the hydraulic steering circuitry to steer the tractor and while such mechanisms are more expensive, they may be used in place of the EZ STEER mechanism.

With regard to the GPS system that is to be used in the system of the present invention, it should be understood that the present invention utilizes a GPS system, rather than having invented it. There are several types of GPS systems that have been developed and marketed and which have been employed in implementations relating to agricultural applications. Some of the systems that have been utilized to date include the RTK (Real Time Kinematics) system that uses a base station and GPS to typically provide a plus or minus one inch accuracy. Other systems that may be used include the DGPS HP (Differential GPS High Performance) system that typically provides accuracy to plus or minus four inches. This version utilizes a GPS satellite signals for basic location information and requires a least an OmniSTAR HP satellite correction signal subscription for each system. Other systems include a DGPS (Differential GPS) system that typically provides accuracy to approximately plus or minus ten inches. This version utilizes GPS satellite signals for basic location information and requires at least an OmniSTAR VBS satellite correction signal subscription for each system or the pre-WAAS signal which is differentiated by the source of correction signal.

It is preferred that the system used with the present invention be the most accurate possible. Because a cultivator, for example, can cut plants from rows as a result of a deviation of only a few inches, the RTK system which has a plus or minus one inch accuracy is preferred over the other above-described systems. To the extent that other systems exist which are more accurate than plus or minus one inch, they are preferred for the reason that such close tolerances can be very important with regard to the successful operation of a guidance system in certain applications.

Since the present invention controls the implement along the preferred paths, a GPS antenna 130 is preferably located on the implement and more particularly on the center of the tool bar 32 of the implement 30. However, it should be understood that it may be located away from center provided offsets are calculated as may be necessary. It may also be beneficial to have the GPS antenna 130 mounted on a structure that is forward of the tool bar by a few inches or more so that some lead time in the position of the path is gained, which would enable timely correction of the path of the implement. In this regard, the antenna 130 may conveniently be mounted on the guidance system hitch 50 itself as shown in FIGS. 2A and 2B. This is desirable because the hitch 50 is supported by the linkages 22, 24 and 26 and as stated above when the angle of the guidance system hitch 50 is changed relative to the mounting hitch 20, it is also important that the links 22, 24, 26 of the mounting hitch 20 be free to move from side to side by a predetermined amount, preferably about 10 inches. This permits angulation of the system hitch 50 to result in the centering movement of the system hitch 50 as well as the rear portion of the mounting hitch 20 relative to the lateral position of the tractor 10 itself. Mounting of the antenna 130 on the system hitch 50 effectively senses this transverse movement and enables accurate operation of the system. It is desirable for other preferred embodiments to include the sensing means for sensing the orientation of said hitch means relative to the mounting hitch and generating a signal indicative of said sensed orientation as has been previously described.

Although not shown, it should be understood that the antenna 130 is in communication with a GPS control module or receiver preferably located within the cab or perhaps on the implement itself. It is preferred that both the receiver and antenna 130 be mounted to one or the other of the implement and the guidance system hitch 50 to eliminate the necessity of disconnecting and connecting cables if the implement is separated from the guidance system hitch 50. Such communication between the control module and the antenna can be accomplished by conductors extending between the two or by a wireless communication link, such as a Bluetooth or other type of communication link.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. Apparatus for positioning a farm implement of the type which has an elongated transverse tool bar to travel along a desired path of movement while being drawn by a motor vehicle moving generally along the path, the vehicle having a three point mounting hitch on the rear end thereof, the mounting hitch being configured to permit lateral movement thereof at least about 10 inches relative to the tractor, said apparatus comprising:

a guidance system hitch for attachment to the mounting hitch of the vehicle and configured to have the implement mounted thereto, said guidance system hitch having hydraulic means for selectively adjusting the horizontal angular orientation of a connecting portion of said guidance system hitch relative to the mounting hitch, the tool bar being operatively attached to said connecting portion of said guidance system hitch to adjust the horizontal angular orientation of said tool bar relative to said guidance system hitch;

a global positioning system (GPS), said GPS including a receiver and an antenna, said antenna being mounted on and above said guidance system hitch, said GPS being operable to detect the position of the tool bar relative to the desired path as the vehicle moves forwardly generally along the desired path and generate a second signal that is indicative of said lateral position;

a control system for controlling said hydraulic means to adjust the angular orientation of said guidance system hitch and tool bar so that the implement follows the desired path of movement in response to said second signals from said global positioning system.

2. Apparatus as defined in claim 1 further comprises first sensing means for sensing the orientation of said guidance system hitch relative to the mounting hitch and generating a first signal indicative of said sensed orientation.

3. Apparatus as defined in claim 1 wherein said guidance system hitch is configured to selectively retract and extend each side of said connecting portion of said guidance system hitch generally horizontally relative to the mounting hitch of the vehicle to thereby adjust the angular orientation of said tool bar relative to the mounting hitch.

4. Apparatus as defined in claim 1 wherein said first sensing means produces a first signal that is indicative of the position of the vehicle relative to the desired path.

5. Apparatus for controlling the position of an implement of the type which has an elongated transverse tool bar being drawn by a tractor relative to a desired path of movement while the tractor travels forwardly generally along the path, the tractor having a three point mounting hitch that is configured for limited lateral movement of about 10 inches relative to the tractor, said apparatus comprising:

a guidance system hitch for attachment to the three point mounting hitch of the tractor and configured to have the implement mounted thereto, said guidance system hitch having hydraulic means to adjust the angular orientation of a connecting portion of said guidance system hitch relative to the mounting hitch by selectively retracting and extending both sides of said connecting portion of said guidance system hitch in a generally horizontal direction relative to the mounting hitch of the tractor wherein the extension or retraction of one side results in a corresponding retraction and extension of the other side;

a global positioning system having a receiver and an antenna, said antenna being operatively connected to one of said guidance system hitch for detecting the position of the tool bar relative to the desired path as the tractor moves generally along the desired path and generating correction signals indicating deviation from the desired path;

a control system responsive to said correction signals for operating said hydraulic means to selectively extend or retract each side of said connecting portion of said guidance system hitch to adjust the horizontal angular orientation of the tool bar.

6. Apparatus for controlling the position of a farm implement of the type which has an elongated transverse tool bar as the implement is drawn by a tractor so that the implement follows a desired path of movement as the tractor moves generally forwardly along the path, the tractor having a three point mounting hitch configured to permit lateral movement thereof at least about 10 inches relative to the tractor, said apparatus comprising:

a guidance system hitch for attachment to the three point mounting hitch of the tractor and configured to have the implement mounted thereto, said guidance system hitch having hydraulic means to adjust the angular orientation of a connecting portion of said guidance system hitch relative to the mounting hitch by selectively retracting and extending both sides of a connecting portion of said guidance system hitch in a generally horizontal direction relative to the mounting hitch of the tractor, wherein the extension or retraction of one side results in a corresponding retraction and extension of the other side;

first sensing means for sensing the horizontal angular orientation of said connecting portion of said guidance system hitch relative to the mounting hitch and generating a first signal indicative of said sensed orientation;

a global positioning system having a receiver and an antenna wherein at least said antenna is mounted on said guidance system hitch or said implement and extends to a location that is at least forwardly of the tool bar including being coextensive with said guidance system hitch, said system being operable to detect the position of the antenna relative to the desired path as the tractor moves generally along the desired path and generate a second signal that is indicative of said lateral position;

means for controlling said hydraulic means to adjust the angular orientation of said said connecting portion of said guidance system hitch so that the implement follows the desired path of movement in response to said second signals from said global positioning system.

* * * * *